(12) United States Patent
Saks, III

(10) Patent No.: US 6,763,861 B2
(45) Date of Patent: Jul. 20, 2004

(54) SUPPORT AND DRAIN/COLLECTOR FOR FLUID FUNNELS AND DRAIN PANS

(76) Inventor: William J. Saks, III, 5687 Handwerk Rd., Germansville, PA (US) 18053

(*) Notice: Subject to any disclaimer, the term of this patent is extended or adjusted under 35 U.S.C. 154(b) by 0 days.

(21) Appl. No.: 10/315,530

(22) Filed: Dec. 9, 2002

(65) Prior Publication Data

US 2004/0108016 A1 Jun. 10, 2004

(51) Int. Cl.⁷ .................................................. B65B 3/06
(52) U.S. Cl. ........................................ 141/106; 141/375
(58) Field of Search ................................ 141/106, 286, 141/311 R, 340–343, 363–366, 369, 375; 222/185

(56) References Cited

U.S. PATENT DOCUMENTS

| | | |
|---|---|---|
| 4,207,933 A | 6/1980 | Howson |
| 4,789,017 A | 12/1988 | Panasewicz et al. |
| 5,222,534 A | 6/1993 | Wilkinson, Jr. |
| 5,385,180 A | 1/1995 | Wittman |
| D375,874 S | 11/1996 | Chrisco |
| 5,607,004 A | 3/1997 | Cope |

Primary Examiner—Gregory Huson
Assistant Examiner—Peter deVore
(74) Attorney, Agent, or Firm—RatnerPrestia

(57) ABSTRACT

Rack system for supporting devices such as funnels, small and fluid containers to drain residual fluid after use. Residual fluid drains into a pan shaped collection device that may be filled with a layer of fluid absorbent material. Drain pans can be positioned on the system for draining residual fluid into the collection device.

13 Claims, 3 Drawing Sheets

SUPPORT AND DRAIN/COLLECTOR FOR FLUID FUNNELS AND DRAIN PANS

BACKGROUND OF THE INVENTION

The present invention pertains to supporting fluid transfer devices, e.g. funnels, small fluid containers e.g. quart bottles of motor oil, and drain pans for collecting residual fluids after the funnels have been used the drain pan has been emptied or fluids have been taken from the fluid containers.

During normal servicing of a motor vehicle an oil change is usually performed. The spent oil is drained from the crank case of the motor into a collecting pan and then is transferred from the collecting pan to a large receptacle for disposal or recycling of the spent oil.

After the service technician replaces the drain plug in the crank case fresh motor oil is introduced through the normal fill pipe using a funnel which may or may not have an extended spout. In most service shops the oil is provided in one quart containers, which are left inverted in the funnel for a period of time to attempt to drain any residual oil from the container into the is crank case.

As with most shops time is of the essence so that while the funnel is left to drain the majority of the oil into the crank case a very small amount of residual oil is left in the funnel that adheres to the sides of the funnel and will generally drip out of the funnel over a long period of time. Likewise, any residual oil adhering to the sides of the container will also take time to drain out of the container.

If the funnel is placed on a work bench or hung through a handle on a tool cabinet oil can eventually drip onto the work surface or onto the floor causing a potential workplace hazard.

A number of devices have been prepared to either support small fluid containers to transfer or drain residual fluids therefore. These are illustrated by U.S. Pat. Nos. 4,207,993, 4,789,017, 5,222,534, 5,385,180 and 5,607,004. A sample funnel holder is shown in U.S. Patent Des. No. 375,874.

Therefore, there is needed a means to collect residual oil from containers, drain pans, funnels and the like for safe disposal and to prevent unsafe conditions in the workplace.

SUMMARY OF THE INVENTION

The present invention provides a system for collecting residual fluids from funnels, fluid dispensing containers and spent fluid collecting devices, for recycle or safe disposal of the residual fluids.

Therefore, in one aspect the present invention is a system for supporting fluid transfer, fluid dispensing or fluid catching devices comprising in combination; a base adapted to support a receptacle for collecting fluids from the transfer, dispensing and catching devices; first means disposed over the collecting receptacle to position one of small fluid containers or funnels so that when the containers or funnels are placed in the support means any fluid remaining in the containers or funnels can be collected in the collecting receptacle; and second means adapted to support a pan shaped fluid catching device over the receptacle in a manner to permit the catching device to drain residual fluids into the collecting receptacle.

DETAILED DESCRIPTION OF THE INVENTION

Figure 1:
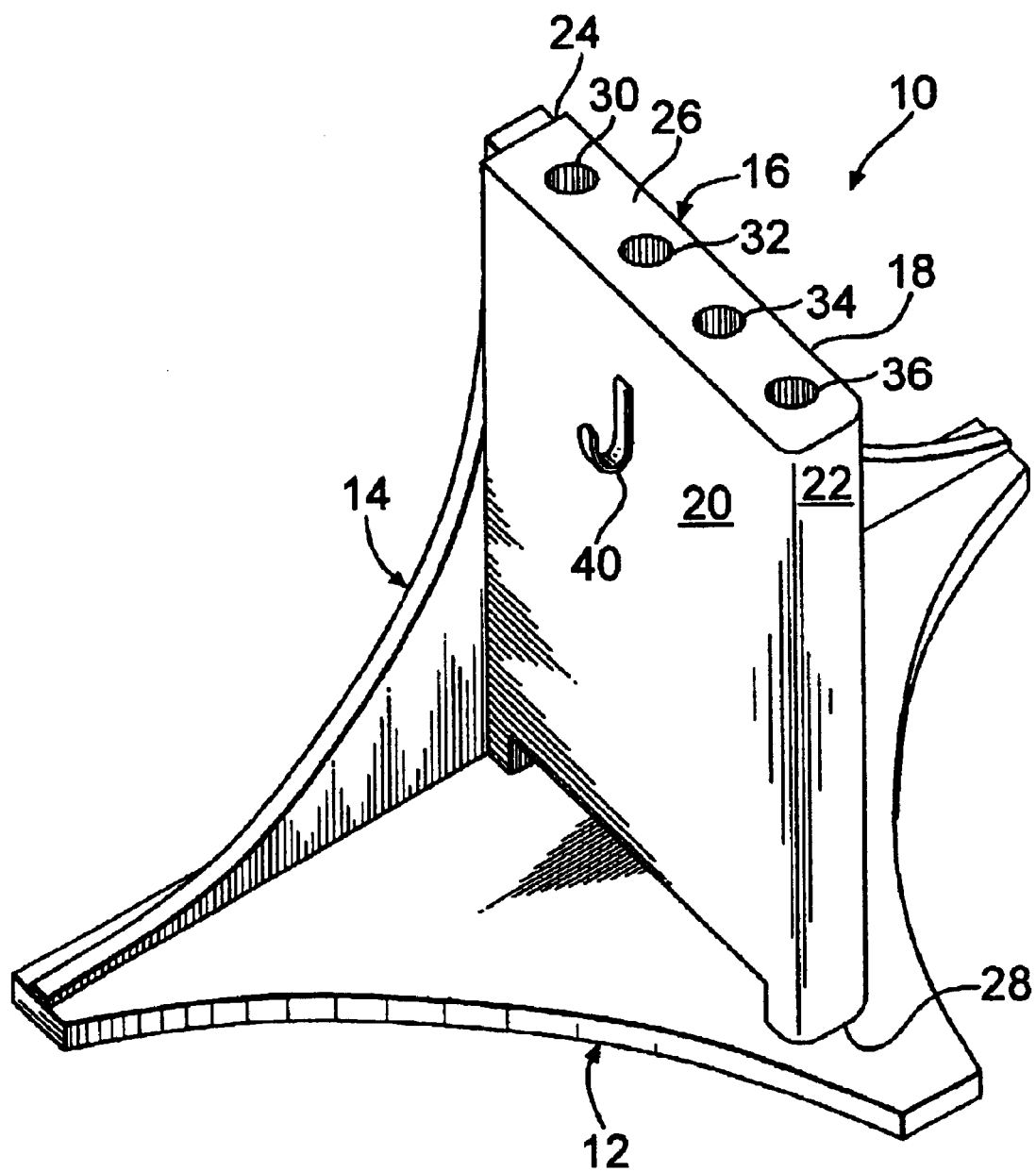
FIG. 1 is a perspective view of the device or system of the present is invention.

Referring to FIG. 1 a preferred embodiment of the present invention is shown as system or device 10.

System 10 includes a base portion 12 which has a generally triangular shape with curved vertical sides of the triangle as shown. The base 12 can be manufactured in any convenient shape consistent with the balance of the disclosure of the invention.

Figure 2:
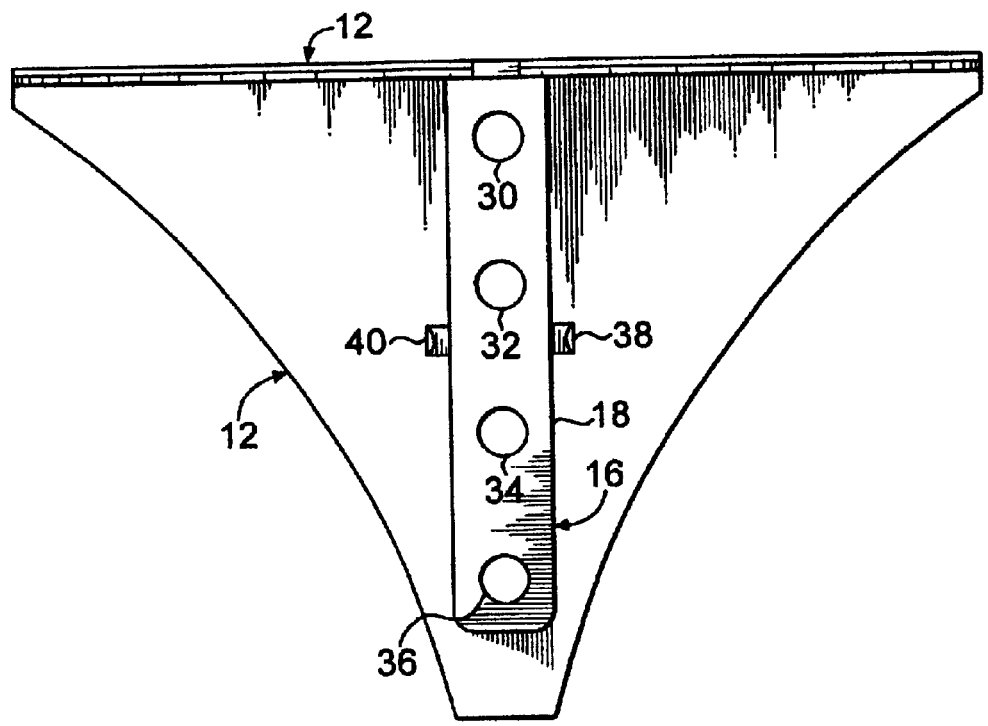
FIG. 2 is a top plan view of the device of FIG. 1.
Figure 3:
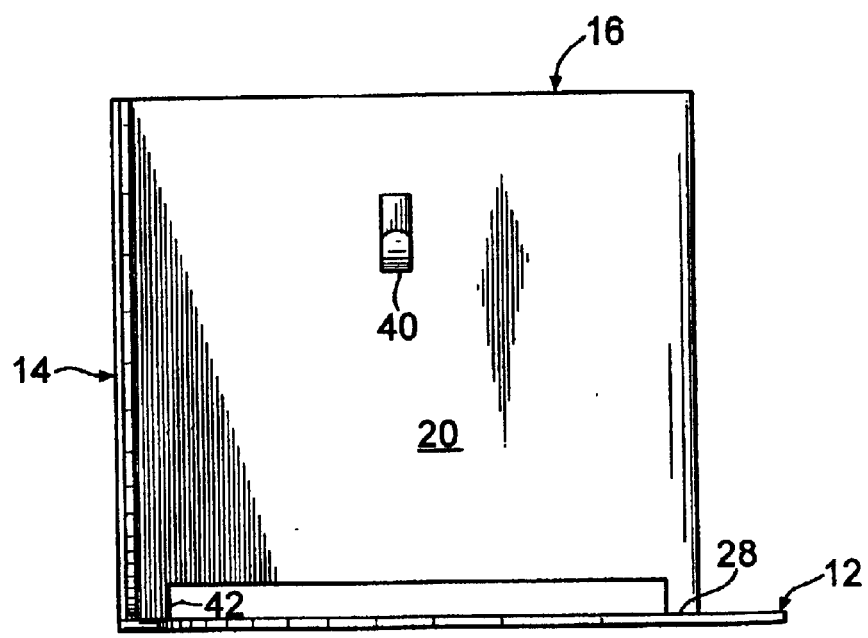
FIG. 3 is a left elevational view of a device of FIG. 1.

Referring to FIG. 1, FIG. 2 and FIG. 3 base 12 has a generally triangular shaped vertical support 14 fixed at a right angle to base 12. Positioned on base 12 and held by vertical support 14 is a generally hollow square prism shaped apparatus support section 16. The term square prism as used here is such as defined on page 62 of the $24^{th}$ Edition of the Machinery Handbook by Erik Oberg, Franklin D. Jones, Holbrook L. Horton and Henry Ryffel, published by Industrial Press Inc., New York.

Support 16 has a pair of opposite generally wider faces 18, 20, a pair of long narrow faces 22, 24 equal in length to faces 18, 20 and a pair of shorter narrow faces 26 and 28.

Shorter face 26 contains a plurality of apertures 30, 32, 34 and 36, the function of which will be explained hereinafter.

Referring to FIG. 2 in addition to the apertures 30, 32, 34 and 36, which may be the ends of tubular sections, faces 18 and 20 are provided with a pair of hook shaped supports 38 and 40.

As shown in FIG. 3 support 16 has a slotted or stepped portion 42 adjacent base 12 to receive a pan shaped receptacle as will hereinafter be more fully explained.

Figure 4:
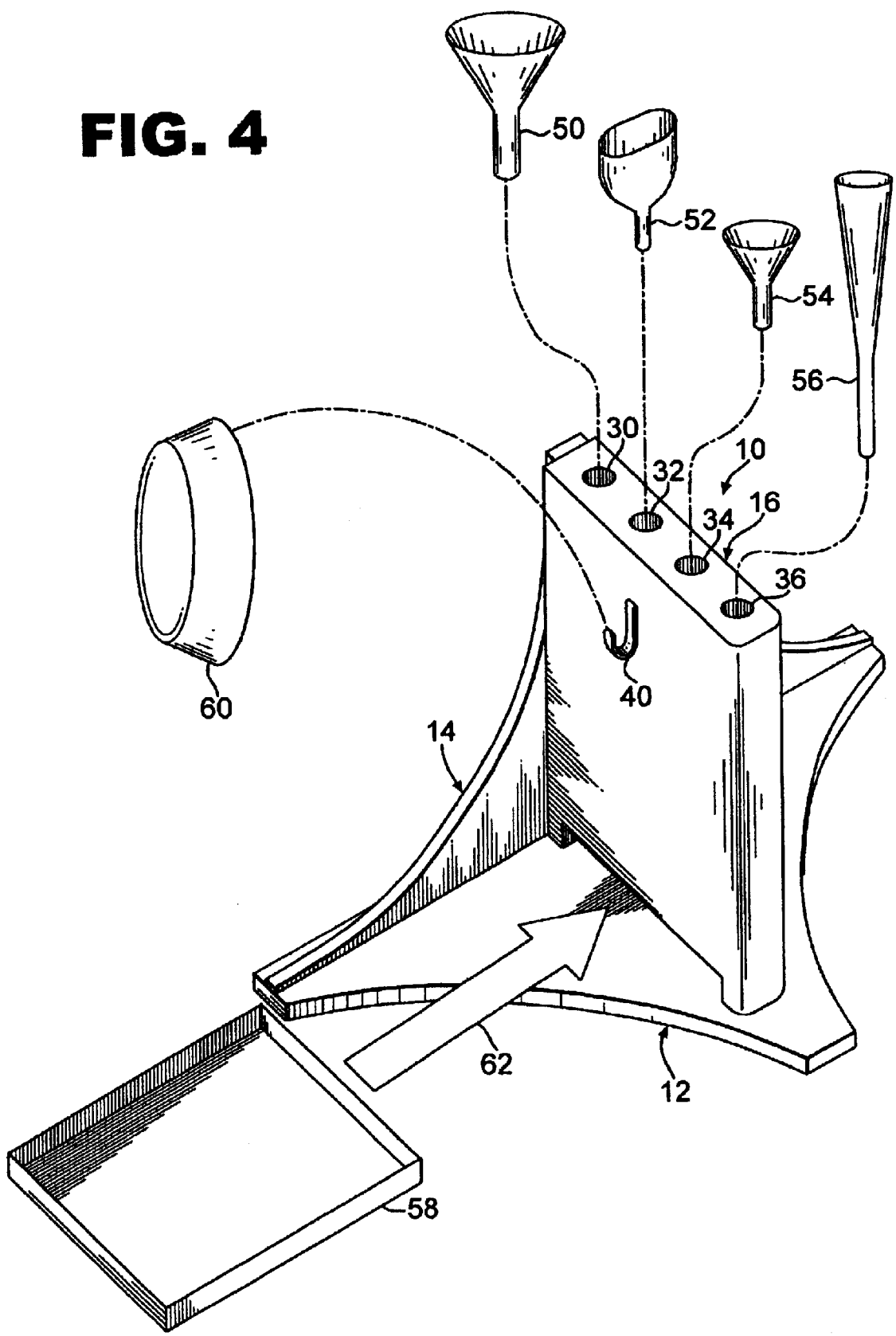
FIG. 4 is an isometric view illustrating use of the system of the present invention.

Referring to FIG. 4 the device 10 is shown with a plurality of various shaped funnels 50, 52, 54 and 56, which may be placed in apertures 30, 32, 34 and 36 respectively. A fluid collection device or pan 58 is placed into the slotted aperture 42 on support 16 for positioning of the pan 58 underneath the spout portions of the funnels 50, 52, 54 and 56. The collection pan 58 is placed in position or removed as shown by arrow 62. Pan 58 may be empty or may contain a layer of a granular adsorbent material as is well known in the art. The funnels 50, 52, 54, 56 will be held in a vertical position in order to drain any residual fluid into the pan 58 and thus prevent residual fluids from being spilled on work surfaces or floors of a shop. In addition to the device 10 positioning the funnels 50, 52, 54 and 56 a drain pan 60 can be positioned on the hook 38 or as shown on hook 40 so that residual fluids from the pan 60 also drain into the collection pan 58.

As can be seen from the foregoing disclosure and description, funnels, such as shown as 50, 52, 54, 56, containing residual fluids, e.g. oil, can be positioned on the device 16 so that residual fluids are captured in the collection pan 58 for safe disposal.

In addition to the funnels shown, quart bottles such as used to contain and dispense motor oil can be placed in the various apertures to assure draining of the residual fluids from the bottles which are normally of a plastic material that is recycled.

The device of the present invention is shown in the form that is convenient for manufacture and which can be fabricated from synthetic materials such as plastic. However, the device can be fabricated from any of conventional materials of construction, e.g., wood or metal.

The particular shape of the apparatus can be varied for instance the base or base plate 12 can be square as can be the vertical support 14. In a simple form the funnel support device can be a single cantilevered piece fastened to the vertical support 14 and the collection pan 58 need not be held by the vertical support 16 as shown in the drawing and described herein. The cantilevered support can also hold the drain pan 60.

Having thus described my invention what is desired to be secured by Letters Patent of the United States is set forth in the appended claims.

What is claimed:

1. A system for supporting fluid transfer, fluid dispensing or fluid catching devices comprising in combination;
   a base adapted to support a collecting receptacle for collecting fluids from said fluid transfer, fluid dispensing and fluid catching devices;
   single support means disposed over said collecting receptacle to position one of small fluid containers or funnels so that when said containers or funnels are placed in said support means any fluid remaining in said containers or funnels can be collected in said collecting receptacle; and
   means on said single support means to support and position a pan shaped fluid catching device over said collecting receptacle in a manner to permit said catching device to drain residual fluids into said collecting receptacle.

2. A system according to claim 1 wherein said collecting receptacle is a shallow pan.

3. A system according to claim 2 wherein a layer of granular absorbent material is disposed in said shallow pan.

4. A system according to claim 1 wherein said single support means is in the shape of generally square prism having two wide long faces, two long narrow faces and two shorter narrow faces disposed vertically on said prism with one shorter narrow face of said prism disposed proximate said collecting receptacle and an opposite shorter narrow face containing a plurality of apertures to receive one of a spout portion of a funnel or a neck of a fluid container whereby said funnel and/or said fluid container can be drained of residual fluids.

5. A system according to claim 4 wherein said means on said single support means comprises a hook shaped member fastened to opposite wide long faces of said prism proximate said shorter narrow face containing said apertures.

6. A system according to claim 4 wherein said face of said square prism opposite said face containing said apertures is slotted to receive and position said collecting receptacle.

7. A system according to claim 1 fabricated from a rigid plastic.

8. A system for supporting fluid transfer, fluid dispensing or fluid catching devices comprising in combination;
   a base adapted to support a collecting receptacle for collecting fluids from said fluid transfer, fluid dispensing and fluid catching devices;
   first means disposed over said collecting receptacle to position one of small fluid containers or funnels so that when said containers or funnels are placed in said support means any fluid remaining in said containers or funnels can be collected in said collecting receptacle said first means is in the shape of generally square prism having two wide long faces, two long narrow faces and two shorter narrow faces disposed vertically on said prism with one shorter narrow face of said prism disposed proximate said collecting receptacle and an opposite shorter narrow face containing a plurality of apertures to receive one of a spout portion of a funnel or a neck of a fluid container whereby said funnel and/or said fluid container can be drained of residual fluids; and
   second means adapted to support a pan shaped fluid catching device over said collecting receptacle in a manner to permit said catching device to drain residual fluids into said collecting receptacle.

9. A system according to claim 8 wherein said collecting receptacle is a shallow pan.

10. A system according to claim 8 wherein a layer of granular absorbent material is disposed in said shallow pan.

11. A system according to claim 8 wherein said second means comprises a hook shaped member fastened to opposite wide long faces of said prism proximate said shorter narrow face containing said apertures.

12. A system according to claim 8 wherein said face of said square prism opposite said face containing said apertures is slotted to receive and position said collecting receptacle.

13. A system according to claim 8 fabricated from a rigid plastic.

* * * * *